United States Patent [19]
Iseli et al.

[11] Patent Number: 5,756,038
[45] Date of Patent: May 26, 1998

[54] PROCESS OF RESHAPING DECORATED PLASTIC MATERIALS

[75] Inventors: Andreas Iseli, Downey; Edward S. Dombroski, Long Beach, both of Calif.

[73] Assignee: Seda Specialty Packaging Corp., Los Angeles, Calif.

[21] Appl. No.: 626,723

[22] Filed: Apr. 1, 1996

[51] Int. Cl.[6] .................................................. B29C 53/20
[52] U.S. Cl. ........................ 264/506; 264/509; 425/393
[58] Field of Search ................................. 425/393, 403; 264/132, 573, 506, 509, 523, 535

[56] References Cited

U.S. PATENT DOCUMENTS

| | | | |
|---|---|---|---|
| 2,890,482 | 6/1959 | Quinche | 425/392 |
| 2,903,744 | 9/1959 | Harrison et al. | 425/393 |
| 2,913,768 | 11/1959 | Lecluyse et al. | 264/132 |
| 2,980,963 | 4/1961 | Makowski | 264/132 |
| 2,983,961 | 5/1961 | Titterton et al. | 264/535 |
| 3,015,857 | 1/1962 | Weinandy | 264/506 |
| 3,402,429 | 9/1968 | Davidson et al. | 425/393 |
| 3,680,763 | 8/1972 | Ludder | 264/535 |
| 4,605,462 | 8/1986 | Lehner | 264/509 |
| 4,898,708 | 2/1990 | Holoubek et al. | 264/573 |
| 5,342,187 | 8/1994 | Ohanesian | 425/70 |
| 5,342,570 | 8/1994 | Ledoux et al. | 264/339 |

FOREIGN PATENT DOCUMENTS

| | | | |
|---|---|---|---|
| 22343 | 1/1981 | European Pat. Off. | 264/506 |
| 2-47035 | 2/1990 | Japan | 425/522 |
| WO 88/08361 | 11/1988 | WIPO | 425/503 |

OTHER PUBLICATIONS

Arthur N. Skeels, Jr., "Guide to Plastic Bottle Decoration", SPE Journal–vol. 27, pp. 30–35, May 1971.

Primary Examiner—Robert Davis
Attorney, Agent, or Firm—Lerner, David, Littenberg, Krumholz & Mentlik

[57] ABSTRACT

A method of reshaping a hollow tube having a circumferential wall defining an inside and an outside of the tube and formed from at least one layer of a thermoformable plastic, with the outside of the wall having at least one decoration, which method includes the steps of juxtaposing one side of the tube with a forming element having a surface in the shape of a pattern, so that the pattern confronts the side of the tube; and heating the tube wall to an elevated forming temperature at which the plastic is capable of being thermoformed and applying a differential fluid pressure to the tube so that the prevailing pressure on the side of the tube opposite the forming element exceeds the pressure prevailing on the side with the forming element, so that the heated tube wall contacts the forming element surface pattern and is thereby formed into conformity with the shape of the pattern. Methods in which a mandrel is used as the forming element are described.

32 Claims, 4 Drawing Sheets

FIG. 2A
FIG. 2B
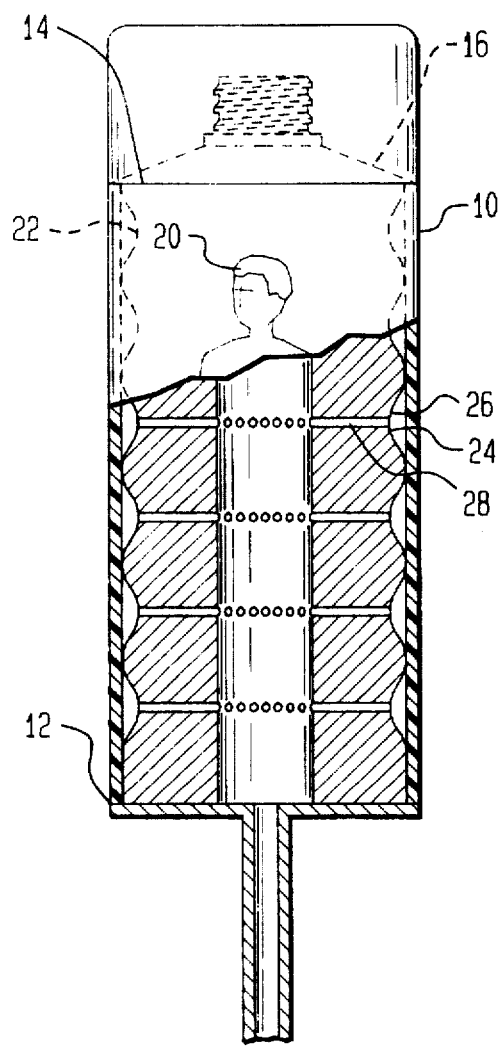
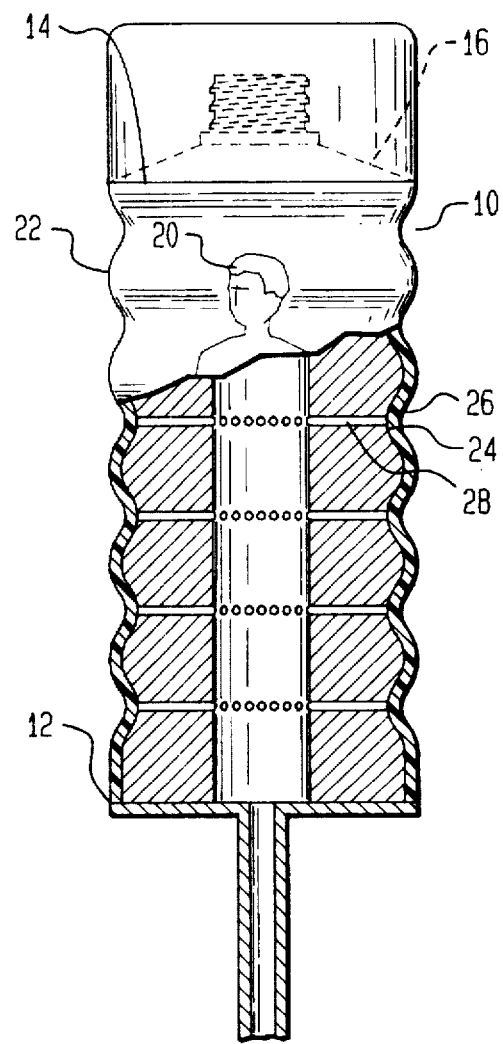

PROCESS OF RESHAPING DECORATED PLASTIC MATERIALS

BACKGROUND OF THE INVENTION

The present invention relates to methods of reshaping thermoformable plastic tubes, the external surfaces of which have at least one decoration. In particular, the present invention relates to methods in which externally decorated thermoformable plastic tubes are vacuum-formed over a mandrel having a surface in the shape of a pattern by heating the tube to an elevated temperature while applying a differential fluid pressure so that the prevailing pressure on the outside of the tube exceeds the pressure on the inside, so that the heated tube contacts the mandrel surface pattern and is thereby formed into conformity with the shape of the pattern.

Flexible plastic tubular containers for preserving and delivering products such as creams or pastes are filled from tubular blanks having a headpiece molded on one end and open on the other end for filling of the tube with the product to be delivered. The open end is then sealed shut, typically with the application of heat and pressure.

The forming of debossed patterns on smooth tubular surfaces is desirable for aesthetic design reasons. A tubular container with an irregularly patterned surface would also be desirable, to make the container easy to grip, especially when squeezing the tube to dispense product. This is especially desirable when the container is used to dispense skin creams or lotions that are slippery to the touch, making smooth-surfaced tubular containers particularly difficult to grip, for example, when replacing the cap after the product has been dispensed.

Tubular containers typically have content-identifying indicia printed directly thereon, for which a smooth tubular surface is required. Today there are blow-molded plastic tubes on the market with raised or debossed patterns, but these tubes cannot be decorated in the area of the pattern. The known means by which debossed patterns may be formed on tubes after printing in the area of the printed pattern results in distortion of the image printed on the tubes.

U.S. Pat. No. 2,913,768 discloses a method by which pre-printed tubular containers having circular cross-sections are forced over an oval-shaped mandrel, without heating, to form tubular containers having oval cross-sections. The disclosed method does not produce a tube having a raised surface pattern. The circumference of the tube remains the same.

There remains a need for a method by which debossed patterns may be formed on pre-printed tubular container blanks.

SUMMARY OF THE INVENTION

This need is met by the present invention. It has now been discovered that vacuum-forming may be employed to introduce debossed patterns on the surface of pre-printed or otherwise pre-decorated tubular container blanks without distorting the appearance of the printing or other decoration.

Therefore, in accordance with the present invention, there is provided a method of reshaping a hollow tube having a circumferential wall defining an inside and an outside of the tube and formed from at least one layer of a thermoformable plastic, with the outside of the wall having at least one decoration, which method includes the steps of:

juxtaposing one side of the tube with a forming element having a surface in the shape of a pattern, so that the pattern confronts the side of the tube; and heating the tube wall to an elevated forming temperature at which the plastic is capable of being thermoformed and applying a differential fluid pressure to the tube so that the prevailing pressure on the side of the tube opposite the forming element exceeds the pressure prevailing on the side with the forming element, so that the heated tube wall contacts the forming element surface pattern and is thereby formed into conformity with the shape of the pattern.

Preferred embodiments of the present invention utilize a mandrel as the forming element and juxtapose the tube with the mandrel by introducing the mandrel into the inside of the tube. Preferred methods in accordance with the present invention apply differential pressure to the tube by connecting the surface pattern of the forming element to a vacuum system.

The method of the present invention makes possible the formation of debossed pattern designs on the surface of pre-printed tubular container blanks. Such designs can be utilized to complement or highlight the printed pattern or other decoration on the surface of the tube, preferably by coordinating the placement of the debossed pattern design with the location of the printing or decoration. The method of the present invention is not limited to debossed pattern designs, but can also be employed to form raised patterns on the surface of smooth, pre-printed or pre-decorated tubular blanks. The method of the present invention will also produce a change in the original circumference of the tube wall.

Other features of the present invention will be pointed out in the following description and claims, which disclose the principles of the invention and the best modes which are presently contemplated for carrying them out.

DETAILED DESCRIPTION OF THE DRAWINGS

A more complete appreciation of the invention and many more other intended advantages can be readily obtained by reference to the detailed description when considered in connection with the following drawings, wherein:

FIG. 2A is a side view depicting a pre-printed plastic tube mounted on a mandrel prior to reshaping, according to one embodiment of the method of the present invention;

FIG. 2B is a side view depicting a pre-printed plastic tube mounted on a mandrel after reshaping, according to one embodiment of the method of the present invention;

It should be noted that the drawings are not necessarily to scale, but that certain elements have been expanded to show more clearly the various aspects of the present invention and their advantages.

DETAILED DESCRIPTION OF THE PREFERRED EMBODIMENT

Figure 1:
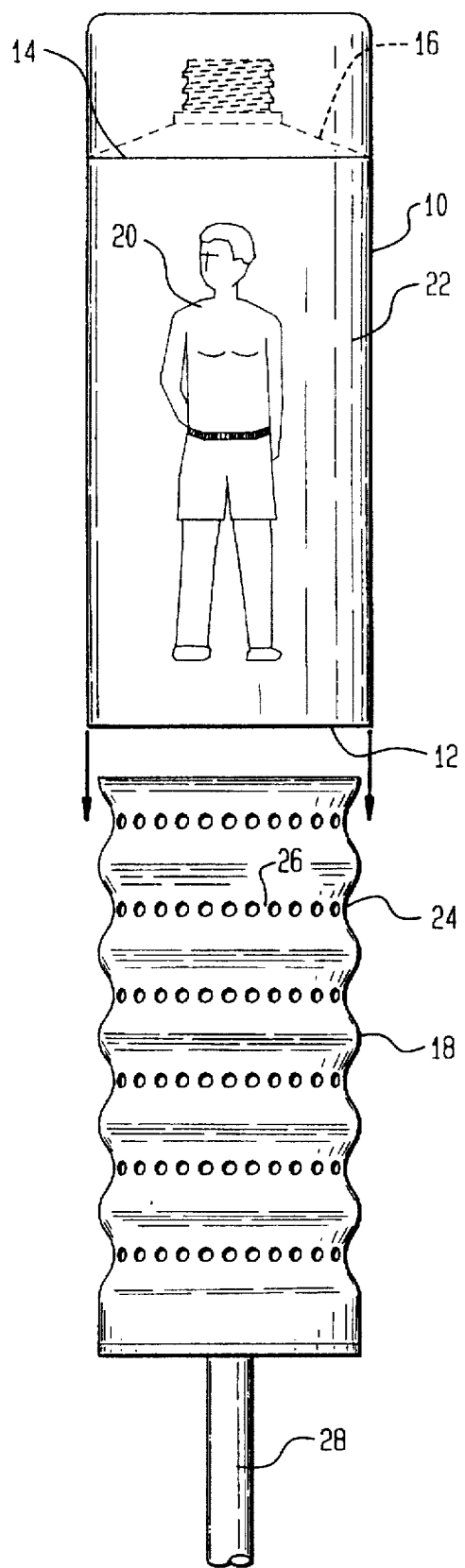
FIG. 1 is a side view depicting the step of introducing a pre-printed plastic tube onto a mandrel according to one embodiment of the method of the present invention.

The means by which the method of the present invention may be employed to reshape pre-printed or pre-decorated tubular container blanks is shown in FIGS. 1, 2A and 2B, in which a prefabricated tubular body 10, typically a thermoformable plastic material, which is open at one end 12 and has a headpiece 16 molded on the opposite end 14, is placed on a forming element or mandrel 18.

The exterior surface 22 of tubular body 10 has decoration 20 pre-printed or otherwise pre-affixed thereto. Mandrel 18 has a depressed pattern 24 on the surface 26 thereof. Alternatively, the mandrel may be replaced with a sleeve device (see FIG. 5). Vacuum line 28 connects the surface 26 of mandrel 18 at pattern 24 to a vacuum system (not shown).

Figure 3:
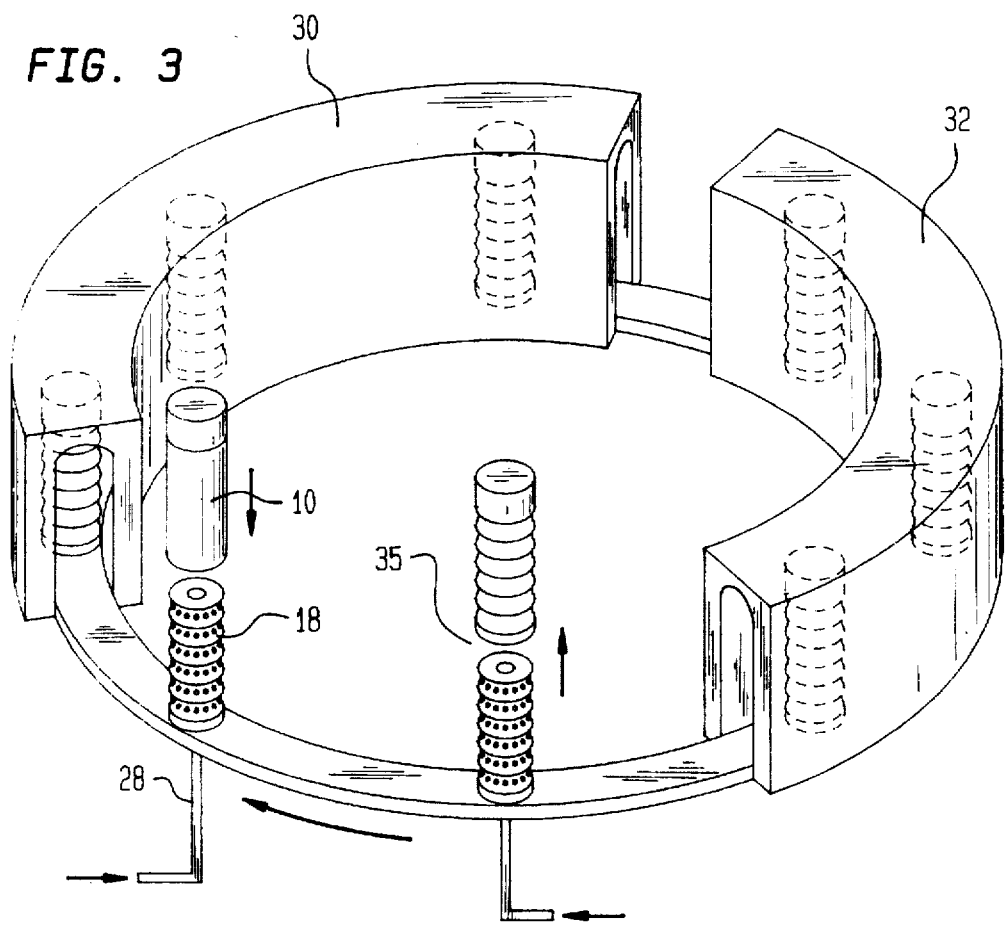
FIG. 3 is a perspective view illustrating one embodiment of the method of the present invention.

As shown in FIG. 3, the mandrel 18 with tubular body 10 atop thereof is passed through heat section 30 wherein the tube is heated to a temperature at which the plastic from which it is formed is capable of being reshaped. At the same time, a vacuum is drawn through vacuum line 28, thereby applying a differential fluid pressure to the tubular body 10, so that the prevailing pressure on the outside of the tube exceeds the pressure on the inside of the tube. As shown in FIGS. 2A and 2B, the pressure differential causes the heated tube wall to contact the surface of the mandrel at the mandrel pattern, thereby forming the tube wall into conformity with the shape of the pattern.

The mandrel with the tubular body atop thereof then passes through cooling section 32 in which the temperature of the tubular body is reduced while the vacuum continues to be drawn through the vacuum line 28 so as to maintain the differential fluid pressure on the wall of the tubular body. The tubular body is cooled to a temperature at which the plastic from which it is formed is no longer in a thermoformable state.

The mandrel with the tubular body atop thereof then passes to station 35. The vacuum drawn through the vacuum line is terminated, thereby reducing the pressure differential at the tube wall. A stream of air from a compressed air source (not shown) is then passed through the vacuum line, thereby ejecting the tubular body from the mandrel.

Figure 4:
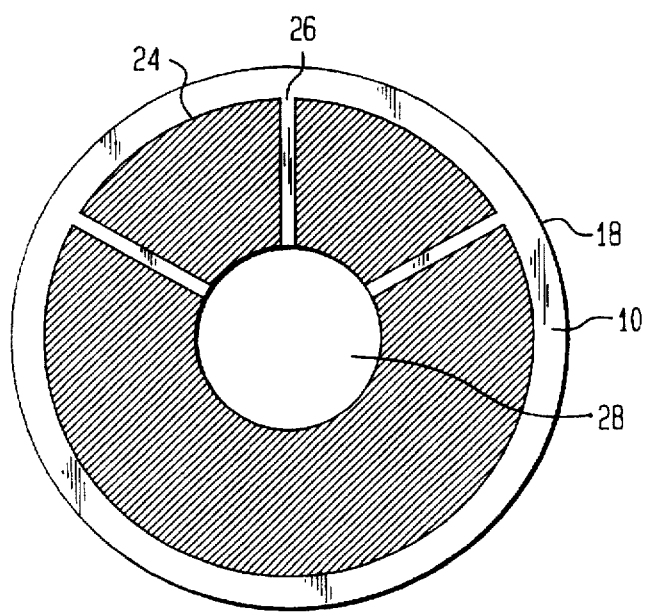
FIG. 4 is a top, cross-sectional view of a mandrel for use in one embodiment of the method of the present invention.

As shown in FIG. 4, the mandrel 18 typically has a circular or oval cross-section that essentially conforms to the cross-section of the tubular body 10 with which it is to be employed. The mandrel 18 supports the tubular body 10 in an upright position. Differential pressure is applied to the wall of the tube by drawing a vacuum from the inside of the tubular body 10 with the vacuum line 28 on the surface 26 at debossed pattern 24. A pressure differential of at least 50 torr should be employed, with a pressure differential greater than 100 torr being preferred.

Suitable thermoformable plastics from which the tubular body 10 may be prefabricated include polyethylene, including LDPE, LLDPE, and HDPE, polypropylene, and the like. The polyethylene or polypropylene may be co-extruded to form a multi-layered tube wall with an additional layer or layers of polyethylene, polypropylene, nylon, barrier materials, and the like. Layers of virgin and non-virgin materials may be combined. The preferred plastics are LDPE and co-extruded materials. The plastic should be thermoformable at a temperature between about 60° C. and about 180° C., and preferably between about 90° C. and about 120° C. Consequently, the method of the present invention preferably heats the tubular body to a temperature between about 60° C. and about 180° C., and more preferably to a temperature between about 90° C. and about 120° C. Any number of conventional means may be employed to heat the tubular body to a thermoformable temperature including, but not limited to, hot air or other gases, radiant electric heat, hot fluids such as water, and the like. After the tubular body 10 has been reshaped, it is rendered non-thermoformable by cooling to a temperature below about 60° C., and preferably to below about 40° C.

The tubular bodies 10 to be employed in the method of the present invention are preferably prefabricated from the thermoformable plastic by extrusion or blow molding, followed by injection molding or compression molding of headpiece 16 to end 14.

Any number of conventional means may be employed to pre-print or pre-affix decoration 20 to the exterior surface 22 of tubular body 10. Indicia may be printed on the surface 22 by spray coating, roller coating, offset printing, silk-screening, and the like. Similarly, a metalized decoration may be applied by hot stamping, or a pressure-sensitive label or decal may be laminated to the surface 22. Heat transfer labels may also be used. In a preferred embodiment of the present invention, the location of the raised pattern that is reshaped on the surface 22 of the tube is coordinated with the location of the decoration 20, so that the pattern highlights or is incorporated into the decoration.

Essentially any pattern capable of being shaped into a thermoformable tube with a forming element may be employed. More than one pattern may be used on a forming element or mandrel.

Multiple patterns may be the same or different.

Figure 5:
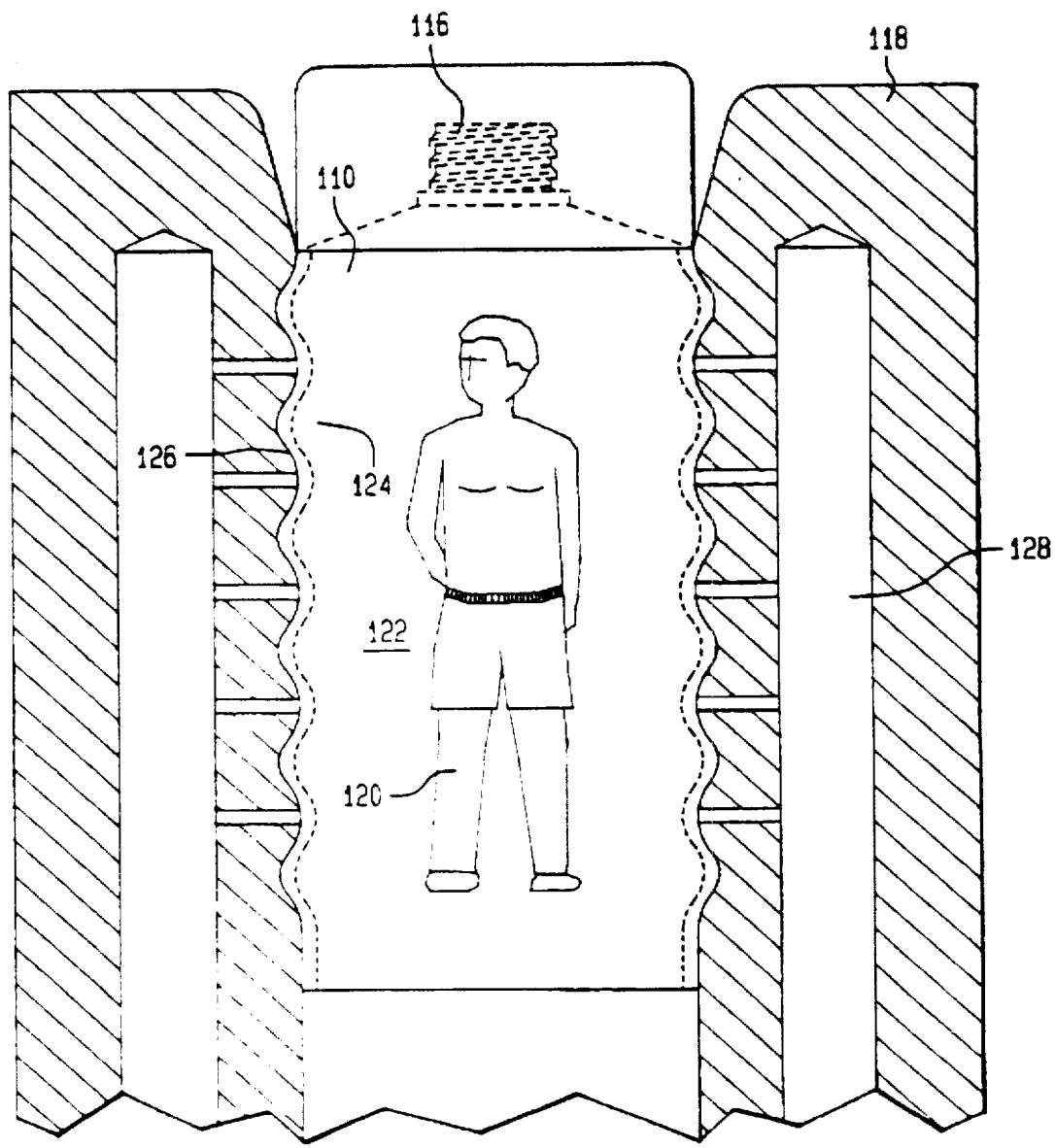
FIG. 5 is a side view depicting a pre-printed plastic tube introduced into a forming element sleeve after reshaping according to another embodiment of the method of the present invention.

The present invention contemplates a method depicted in FIG. 5 in which the forming element is a sleeve 118 into which a prefabricated tube 110 with headpiece 116 is introduced. The tube 110 has an exterior surface 122 pre-printed with decoration 120. The forming element pattern would then be located on an interior surface 126 of the sleeve 118 and a vacuum would be drawn from the interior of the sleeve with vacuum line 128 to create a pressure differential across the wall of the tube while heat was applied to the interior of the sleeve in order to heat the tube to a temperature at which thermoforming of raised pattern 124 would occur.

The method of the present invention permits the manufacture of printed or decorated tubular plastic bodies and tubes having raised or depressed patterns on their surfaces from pre-printed or pre-decorated tubular bodies and tubes. The method overcomes the problem of printing or otherwise decorating a tubular surface having a raised or depressed pattern and permits the formation of such patterns on a tubular surface that has been pre-printed or pre-decorated.

The tubular body resulting from the process of the present invention is a printed or decorated container with a raised or depressed surface pattern of great utility in cosmetic packaging and the like. The method of the present invention permits the printing or decorating of containers with raised or depressed patterns utilizing techniques ordinarily reserved for smooth-surfaced containers.

As will be readily appreciated, numerous variations and combinations of the features set forth above can be utilized without departing from the present invention as set forth in the claims. Such variations are not regarded as a departure from the sprit and scope of the invention, and all such variations are intended to be included within the scope of the following claims.

What is claimed is:

1. A method of reshaping a hollow tube having a circumferential wall defining an inside and an outside of said tube and formed from at least one layer of a thermoformable plastic, said outside of said wall comprising at least one decoration, and said method comprising the steps of:

introducing a mandrel into said inside of said tube said mandrel having a surface in the shape of a pattern, so that said pattern confronts said inside of said tube; and heating said tube wall to an elevated forming temperature at which said plastic is capable of being thermoformed and applying a differential fluid pressure to said tube so that the prevailing pressure on said outside of said tube exceeds the pressure prevailing on said inside of said tube, so that said heated tube wall contacts said mandrel surface pattern and is thereby formed into conformity with the shape of said pattern.

2. The method of claim 2, wherein said mandrel has a circular or oval cross-section with essentially the same diameter as said tube.

3. The method of claim 1, wherein said surface pattern of said mandrel is connected to a vacuum system and said step of applying the differential fluid pressure comprises applying differential fluid pressure with said vacuum system.

4. The method of claim 1, wherein said tube is heated on said mandrel.

5. The method of claim 1, wherein said tube is heated while said differential pressure is being applied.

6. The method of claim 1, wherein said tube is heated to a temperature between about 60° C. and about 180° C.

7. The method of claim 1, further comprising the step of cooling said tube to a temperature below which said plastic is capable of being thermoformed after said tube wall has been formed into conformity with said shape of said mandrel surface pattern.

8. The method of claim 7, wherein said differential pressure is maintained while said tube is cooled.

9. The method of claim 1, further comprising the step of removing said tube from said mandrel after said tube wall has been formed into conformity with the shape of said mandrel surface pattern.

10. The method of claim 1, wherein said tube comprises a headpiece molded thereon.

11. The method of claim 1, wherein said thermoformable plastic is selected from the group consisting of polyethylene and polypropylene.

12. The method of claim 1, wherein said tube wall comprises a plurality of co-extruded thermoformable plastic layers.

13. The method of claim 1, wherein said decoration comprises information-bearing indicia.

14. The method of claim 1, wherein said decoration is pre-printed on said tube by spray-coating, roller-coating, offset printing, or silk-screening.

15. The method of claim 1, wherein said decoration comprises a metallic decoration pre-applied to said tube by hot stamping.

16. The method of claim 1, wherein said decoration comprises a pressure-sensitive or heat-transfer label or a decal pre-applied to said tube.

17. The method of claim 1, wherein the tube wall is formed into conformity with the shape of said mandrel surface pattern at the location of said decoration on said tube wall.

18. A method of reshaping a hollow tube having a circumferential wall defining an inside and an outside of said tube and formed from at least one layer of a thermoformable plastic, said outside of said wall comprising at least one decoration, and said method comprising the steps of:

introducing into said inside of said tube a mandrel having a surface in the shape of a pattern; and heating said tube wall to an elevated forming temperature at which said plastic is capable of being thermoformed and applying a differential fluid pressure to said tube so that the prevailing pressure on said outside of said tube exceeds the pressure prevailing on said inside of said tube, so that said heated tube wall contacts said mandrel surface pattern and is thereby formed into conformity with the shape of said pattern.

19. The method of claim 18, further comprising the step of cooling said tube wall to a temperature below which said plastic is capable of being thermoformed after said tube wall has been formed into conformity with said shape of said mandrel surface pattern.

20. A method of reshaping a hollow tube having a circumferential wall defining an inside and an outside of said tube and formed from at least one layer of a thermoformable plastic, said outside of said wall comprising at least one decoration, and said method comprising the steps of:

juxtaposing one side of said tube with a mandrel having a surface in the shape of a pattern, so that said pattern confronts said side of said tube, said surface pattern of said mandrel being connected to a vacuum system through the interior of said mandrel; and heating said tube wall to an elevated forming temperature at which said plastic is capable of being thermoformed and applying a differential fluid pressure to said tube with said vacuum system so that the prevailing pressure on the side of said tube opposite said mandrel exceeds the pressure prevailing on said side confronting said mandrel, so that said heated tube wall contacts said mandrel surface pattern and is thereby formed into conformity with the shape of said pattern.

21. The method of claim 20 wherein said tube is heated while said differential pressure is being applied.

22. The method of claim 20 wherein said tube is heated to a temperature between about 60° C. and about 180° C.

23. The method of claim 20 further comprising the step of cooling said tube to a temperature below which said plastic is capable of being thermoformed after said tube wall has been formed into conformity with said shape of said mandrel surface pattern.

24. The method of claim 23 wherein said differential pressure is maintained while said tube is cooled.

25. The method of claim 20 wherein said tube comprises a head piece molded thereon.

26. The method of claim 20 wherein said thermoformable plastic is selected from the group consisting of polyethylene and polypropylene.

27. The method of claim 20 wherein said tube wall comprises a plurality of co-extruded thermoformable plastic layers.

28. The method of claim 20 wherein said decoration comprises information-bearing indicia.

29. The method of claim 20 wherein said decoration is preprinted on said tube by spray coating, roller coating, offset printing or silk-screening.

30. The method of claim 20 wherein said decoration comprises a metallic decoration preapplied to said tube by hot stamping.

31. The method of claim 20 wherein said decoration comprises a pressure-sensitive or heat transfer label or a decal preapplied to said tube.

32. The method of claim 20 wherein said tube wall is formed into conformity with the shape of said mandrel surface pattern at the location of said decoration on said tube wall.

* * * * *

UNITED STATES PATENT AND TRADEMARK OFFICE
CERTIFICATE OF CORRECTION

PATENT NO. : 5,756,038
DATED : May 26, 1998
INVENTOR(S) : Iseli et al.

It is certified that error appears in the above-identified patent and that said Letters Patent is hereby corrected as shown below:

Column 5, line 9, "claim 2" should read --claim 1--.

Signed and Sealed this

First Day of September, 1998

Attest:

BRUCE LEHMAN

*Attesting Officer*  *Commissioner of Patents and Trademarks*